March 17, 1925.
C. E. JOHNSON
COMBINATION FAUCET
Filed Aug. 6, 1924
1,530,050
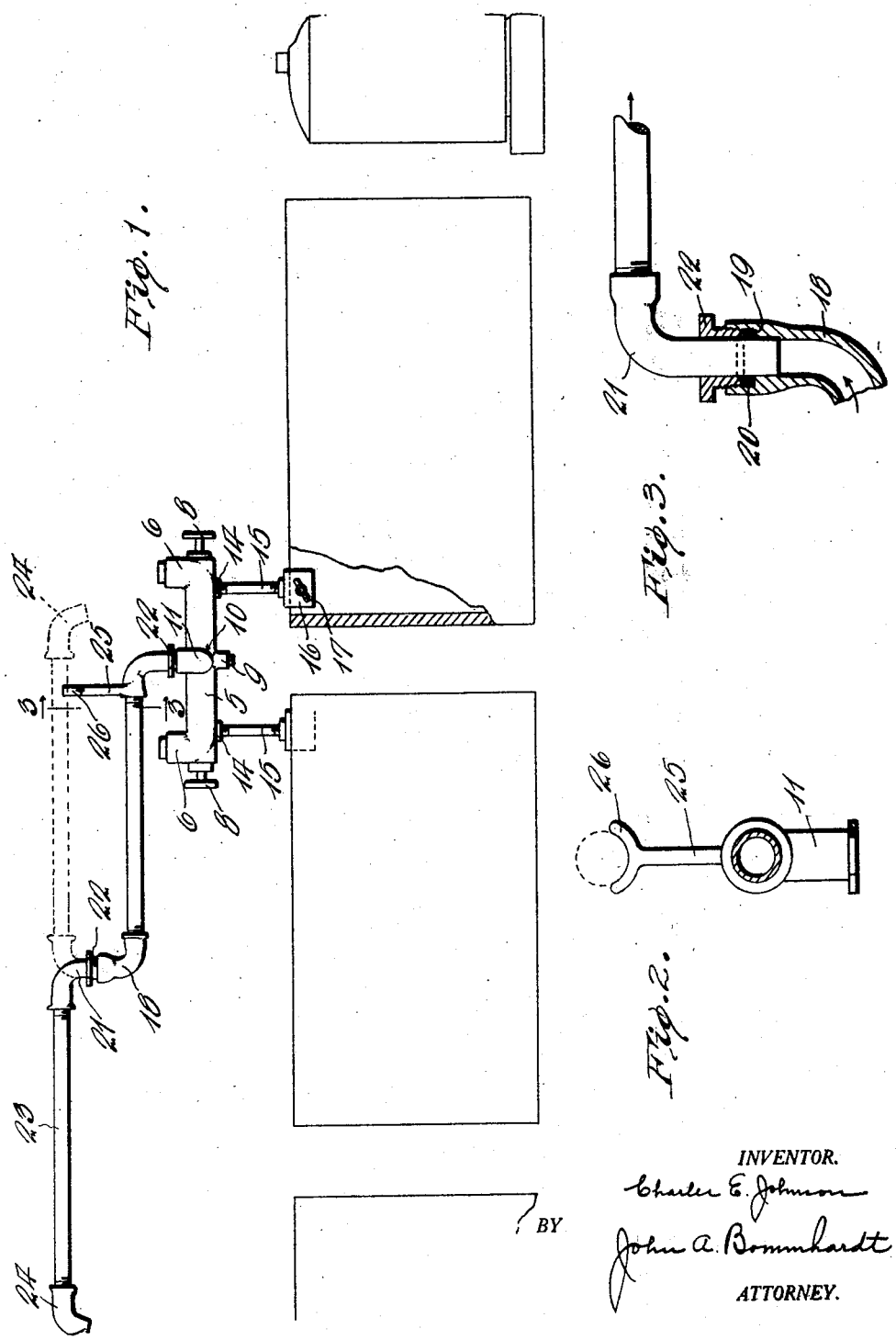
INVENTOR.
Charles E. Johnson
BY
John A. Bommhardt
ATTORNEY.

Patented Mar. 17, 1925.

1,530,050

UNITED STATES PATENT OFFICE.

CHARLES E. JOHNSON, OF CLEVELAND, OHIO.

COMBINATION FAUCET.

Application filed August 6, 1924. Serial No. 730,530.

*To all whom it may concern:*

Be it known that I, CHARLES E. JOHNSON, a citizen of the United States, residing at Cleveland, in the county of Cuyahoga and State of Ohio, have invented certain new and useful Improvements in Combination Faucets, of which the following is a specification.

This invention is an adjustable and extensible combination faucet primarily designed to convey water into any of the usual tubs, boilers etc., ordinarily closely associated for washing clothes and the like.

Another object is to so arrange a combination faucet of this character as to eliminate the use of hose or buckets which are ordinarily employed to convey water to receptacles rather remotely positioned with relation to the source of water supply.

Other objects will be in part obvious and in part pointed out hereinafter.

In order that the invention and its mode of operation may be readily understood by persons skilled in the art, I have in the accompanying illustrative drawings, and in the following detailed description based thereon set out one possible embodiment of the same.

Figure 1 is a front elevation of the tubs and faucet with its nozzle;

Figure 2 is a sectional view taken substantially on the line 3—3 of Figure 2, and Figure 3 is a sectional view showing the connection between pipe sections forming the adjustable nozzle.

Having particular reference to the drawings throughout which similar characters of reference designate similar parts, this device may be stated as comprising a combined hot and cold water faucet wherein the body portion 5 is elongated and provided with upturned ends 6 which are connected to hot and cold water supply pipes (not shown), in the usual manner. These valves are arranged upon stems rotatable by means of hand wheels 8 or the like in the usual manner.

Intermediate these valves a drain outlet 9 is formed, the function thereof being obvious. At right angles to this drain opening is an outlet communicating with an outlet elbow 10 whose vertical portion 11 extends upwardly for connection to a nozzle hereinafter set forth.

A pair of spaced bosses 14 is formed upon the lower side of the faucet body, each having a threaded socket engaged with short pipe sections 15 upon the lower ends of which are threaded substantially U-shaped brackets 16. These brackets 16 straddle the upper edges of the tubs in this instance and are clamped thereon by screws 17 or the like devices. Obviously, adjustment of the body is possible through this construction.

Figure 3 details the manner in which I pivotally connect the pipe sections making up the part I term a nozzle, this structure consisting in providing one elbow 18 and the other elbow 11 which is cast with the faucet body, with an enlarged upper end which is internally threaded and annularly shouldered as at 19. Upon this shoulder 19 is arranged a packing ring or gasket 20 which is pressed into tight engagement with the lower end portion of the elbow 21 forming the other part of the joint. It is obvious that the packing nut 22 having the tapered lower edge will effect a water tight joint as a result of its pressure upon the packing ring.

As shown, the outer section 23 of the nozzle is arranged in a plane above the first section and has a curved elbow 24 to direct the water downwardly into a receptacle. At times it is desired to attach a hose to this nozzle and during this period the pipe sections must be held against excessive movement and strain.

For this reason I form integral with the faucet body carrying elbow 18 an upstanding retaining bracket 25 whose upper end 26 is substantially U-shaped and reliably retains the outer pipe section when desired.

Certain changes in the minor details of construction may be resorted to and such of these changes as may fall within the scope of the appended claims, I consider within the spirit of my invention.

I claim:

1. A nozzle of the character described comprising a pair of pipe sections pivotally inter-connected, one pipe section being connected to a source of water supply, an upstanding bracket carried by the section adjacent its point of connection to the water supply source, and the second section being arranged in a plane above the first section and movable into locking engagement with said bracket.

2. The combination of a hot and cold water faucet having a common outlet, a nozzle connected to the outlet and comprising a pair of pipe sections pivotally inter-connected, one section being pivotally connected to the faucet at said common outlet, a bracket arranged upon said section adjacent its connection to the faucet and the second section being arranged in a plane above the first section and movable into vertical alinement with the first section and simultaneously into locking engagement with said bracket.

In testimony whereof, I affix my signature.

CHARLES E. JOHNSON.